United States Patent [19]

Tonsor

[11] Patent Number: 4,636,013
[45] Date of Patent: Jan. 13, 1987

[54] TRACK SHOE DEFLECTION LIMITER FOR ENDLESS TRACK ASSEMBLIES

[75] Inventor: Andrew J. Tonsor, East Peoria, Ill.

[73] Assignee: Caterpillar Inc., Peoria, Ill.

[21] Appl. No.: 794,908

[22] Filed: Nov. 4, 1985

[51] Int. Cl.⁴ .............................................. B62D 55/22
[52] U.S. Cl. ............................................................ 305/48
[58] Field of Search ................................. 305/47–49, 305/39

[56] References Cited

U.S. PATENT DOCUMENTS

| | | | |
|---|---|---|---|
| 1,568,371 | 1/1926 | Festary . | |
| 1,991,502 | 2/1935 | Henneuse | 305/48 X |
| 2,115,227 | 4/1938 | Kuchar | 305/48 |
| 2,563,848 | 8/1951 | Knox | 305/10 |
| 3,764,185 | 10/1973 | Symmank | 305/47 |
| 4,036,538 | 7/1977 | Haslett et al. | 305/47 |
| 4,114,958 | 9/1978 | Boggs | 305/56 |
| 4,116,497 | 9/1978 | Schimpf et al. | 305/41 |
| 4,128,277 | 12/1978 | Meisel, Jr. | 305/54 |
| 4,222,616 | 9/1980 | Brewer | 305/54 |

FOREIGN PATENT DOCUMENTS

| | | | |
|---|---|---|---|
| 2207 | of 1926 | Australia | 305/48 |
| WO81/00543 | 3/1981 | PCT Int'l Appl. | |
| 306431 | 2/1929 | United Kingdom | 305/38 |
| 585251 | 2/1947 | United Kingdom | 305/48 |

Primary Examiner—David A. Scherbel
Attorney, Agent, or Firm—Claude F. White

[57] ABSTRACT

A track shoe deflection limiter is fastened to each outboard edge portion of each track shoe of an endless track assembly. Each deflection limiter has a first arm portion and a second arm portion. The first arm portion of each limiter overlaps a portion of the adjacent track shoe and is in close proximity to the second arm portion of the limiter which is fastened on the adjacent track shoe. When wide track shoes are used on a track-type vehicle, the outer end portions of the shoes are often twisted and deflected, relative to adjacent shoes, by an external force, such as a rock which the track shoe passes over. The shoe deflection is transferred to the track joints, including the track links, bushings, pins, and seals, which results in accelerated wear of these track assembly components. The track shoe deflection limiter of the present invention utilizes contact between adjacent deflection limiters to share externally imposed forces between adjacent track shoes, thereby limiting the deflection of individual track shoes.

7 Claims, 4 Drawing Figures

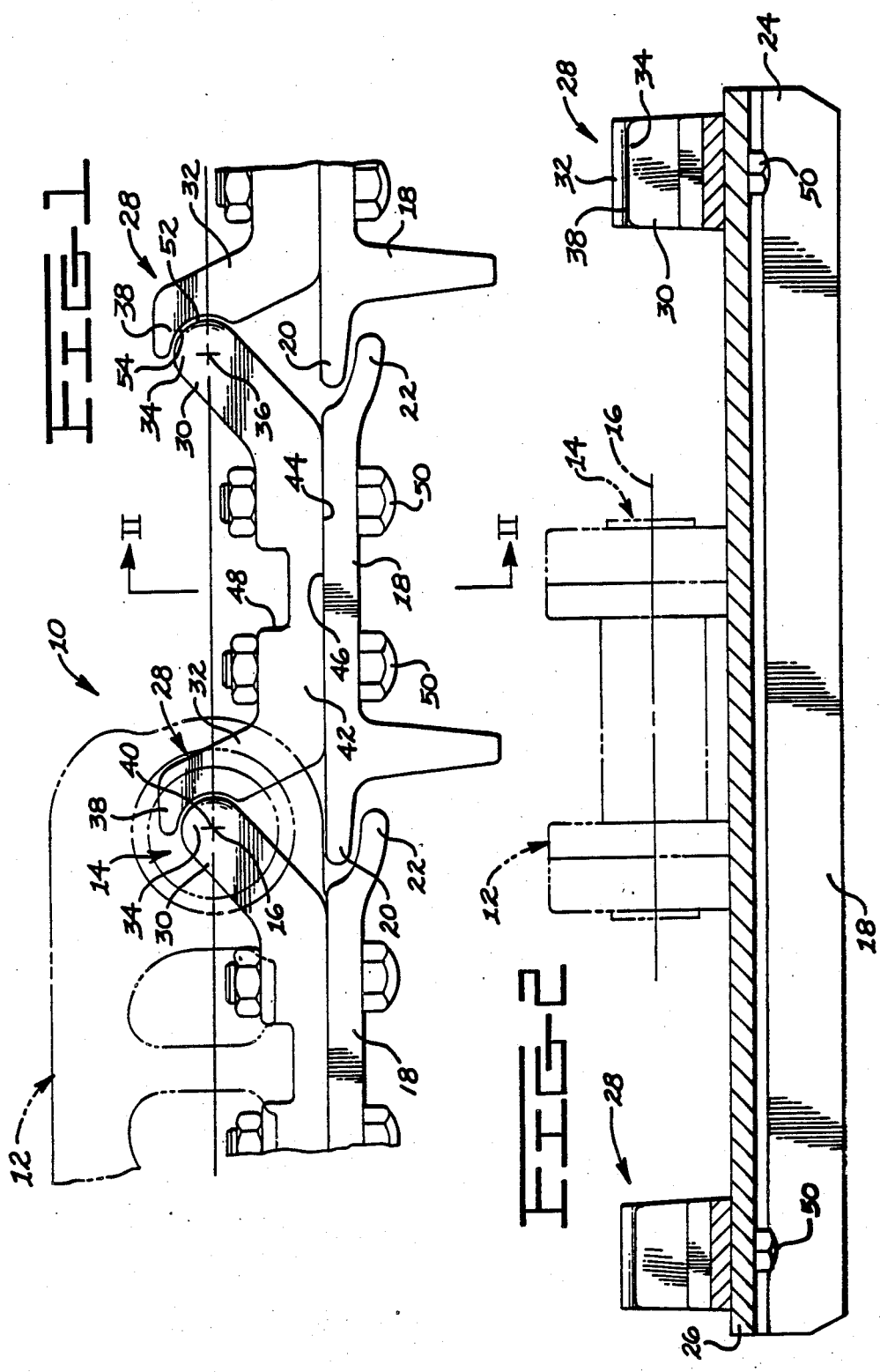

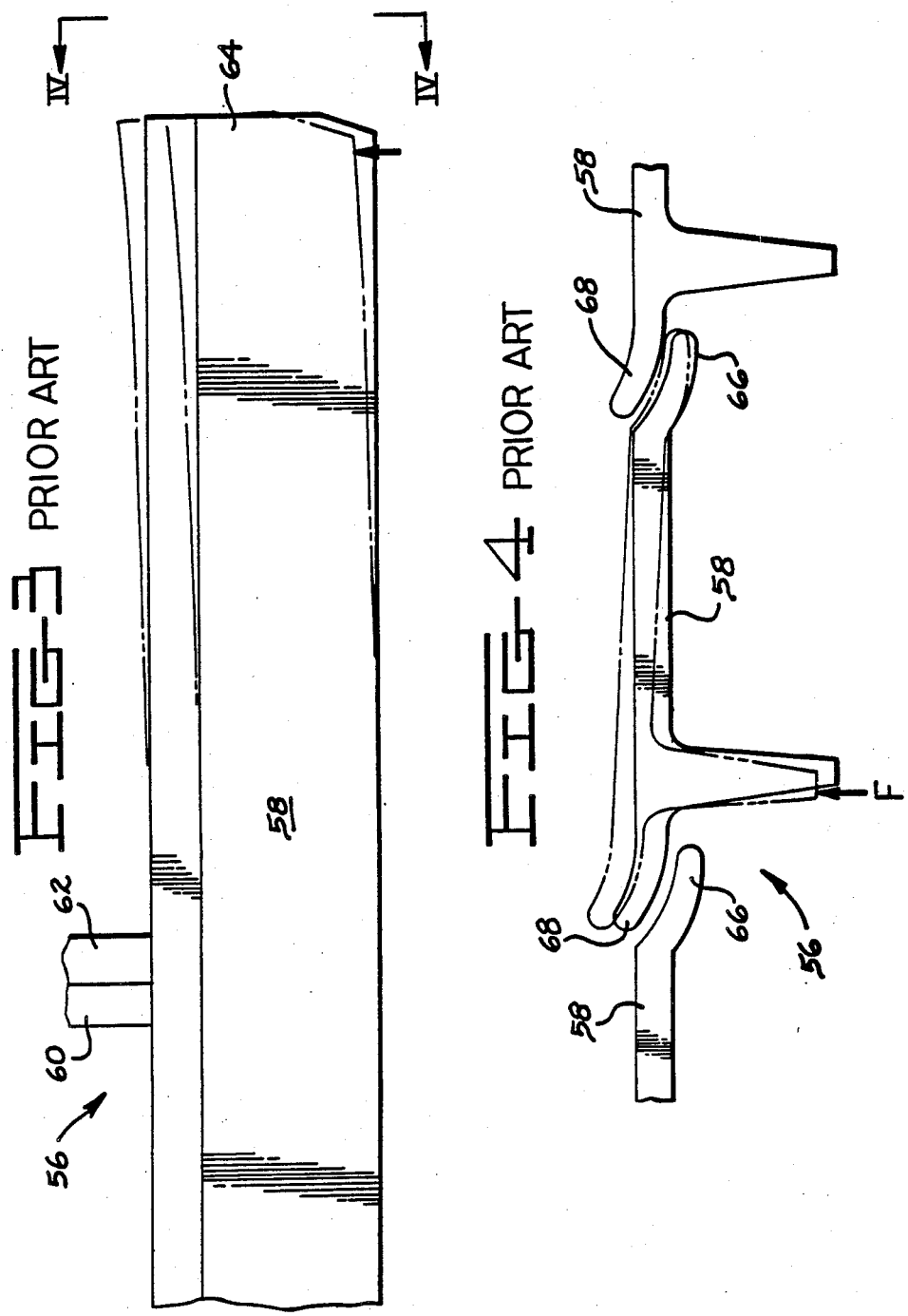

TRACK SHOE DEFLECTION LIMITER FOR ENDLESS TRACK ASSEMBLIES

DESCRIPTION

1. Technical Field

This invention relates generally to endless track assemblies and more particularly to deflection limiting members which limit deflection of individual track shoes in a vertical direction when an external force is applied to the track shoes.

2. Background Art

Track-type vehicles, such as bulldozers, bucket loaders, and excavators, are supported and propelled by endless self laying track chain assemblies equipped with steel track shoes. Because of the large ground contacting area of the plurality of track shoes, the total unit ground pressure produced by the vehicle is relatively low. However, in certain work applications and soil conditions, extra wide track shoes are utilized on the vehicle to provide even lower unit ground pressure. When such extra wide track shoes are used, vertically applied loads to the outer, unsupported edges of the shoes causes twisting and deflection of the shoes which then generates increased stress in the track assembly components. The increase in stress can lead to early hour structural failure in the track assembly components. Additionally, the twisting and deflecting of the shoes can cause endplay to develop in the track joints which can result in loss of lubricant, entry of dirt into the joint, and overall increased internal wear.

One type of construction for increasing the lateral stiffness of wide track shoes is disclosed in U.S. Pat. No. 4,128,277 issued to T. C. Meisel, Jr. on Dec. 5, 1978. In this patent, one or more stiffener members extend laterally across each track shoe and are attached to the shoes and the track links. Although this structure provides effective lateral stiffening of the wide shoes, considerable weight and expense are added to the track assembly.

Another type of construction for resisting torsional loads imposed on wide track shoes of a track assembly is disclosed in International Publication No. WO 81/00543, published on Mar. 5, 1981 to inventor T. C. Meisel, Jr. In this disclosure, one or more auxiliary chain assemblies interconnect the track shoes and are disposed on the outboard ends of the shoes. This structure provides effective lateral stability to the wide shoes, but add a considerable amount of weight and cost, and is also quite complex.

The present invention is directed to overcoming one or more of the problems as set forth above.

DISCLOSURE OF THE INVENTION

In one aspect of the present invention, an endless track assembly has a plurality of track link assemblies and a plurality of pivot joints which successively couple the link assemblies together, with each pivot joint having a transversely disposed pivot axis. The track assembly also has a plurality of track shoes, with each shoe being mounted transversely across one of the link assemblies. Each track shoe has first and second ends and first and second edge portions which are laterally spaced from the link assemblies. Deflection limiting means is associated with the track assembly and includes a plurality of first and second arms mounted on the track shoes. A portion of each second arm is in close overlying proximity to a portion of each first arm.

Track-type vehicles are often equipped with extra wide track shoes to provide low unit ground pressure, or floatation, for the vehicle. The track shoes are generally connected to, and are supported by, a plurality of pivotally interconnected link assemblies near the central portion of the shoes. The outer edges of the shoes are relatively unsupported and are often subjected to vertically applied external forces. These forces can twist and deflect the shoes which produces excessive stress into the components of the track assembly. This can cause accelerated wear and early structural failures.

The deflection limiting means of the present invention substantially extends the useful life of the track assembly components by reducing the stress introduced into such components. This is accomplished by limiting the twisting and deflecting of individual track shoes through the sharing of vertically applied loads between adjacent track shoes.

BRIEF DESCRIPTION OF THE DRAWINGS

FIG. 1 is a diagrammatic side elevational view of a portion of a track assembly embodying the present invention;

FIG. 2 is a diagrammatic sectional view taken generally along the lines II—II of FIG. 1;

FIG. 3 is a diagrammatic frontal view of a portion of a track assembly illustrating the problem with the prior art; and FIG. 4 is a diagrammatic side view taken generally along lines IV—IV of FIG. 3.

BEST MODE FOR CARRYING OUT THE INVENTION

Referring to the drawings, and in particular, FIGS. 1 and 2, an endless track assembly 10 includes a plurality of track link assemblies 12 which are successively coupled together by a plurality of pivot joints 14. Each of the pivot joints 14 has a transversely disposed pivot axis 16. A track shoe 18 is mounted transversely across each one of the link assemblies 12 with each shoe 18 having first and second ends 20,22 and first and second spaced apart outer edge portions 24,26. The first and second outer edge portions 24,26 are laterally spaced from the link assemblies 12.

The track assembly 10 further includes deflection limiting means 28, including a plurality of first arms 30 and a plurality of second arms 32. Each of the first arms 30 has a convex or arcuate journal portion 34 which is generated about a pivot center point 36, which is substantially coaxial with one of the pivot axis 16. Each of the second arms 32 has a concave or arcuate socket portion 38 which is generated about a second center point 40 which is substantially coincident with the first center point 36.

One of the first arms 30 is mounted on each track shoe 18 adjacent the second end 22 of the shoe 18 and at each of the first and second outer edge portions 24,26. In a similar manner, one of the second arms 32 is mounted on each track shoe 18 adjacent the first end 20 of the shoe and at each of the first and second outer edge portions 24,26. With the first and second arms 30,32 mounted in this manner, the arcuate socket portion 38 of each arm 32 is in closely overlying proximity to the arcuate journal portion 34 of each arm 30. Although the first and second arms 30,32 can be separate and distinct members, in the preferred embodiment, the deflection limiting means 28 consists of a body member 42 having the arms 30,32 at opposite ends of the body. The body member 42 has a mounting surface 44, which contacts the surface 46 of the shoes 18, and a central mounting portion 48 between the arms 30,32. A plurality of fasteners 50 penetrate the central portion 48 of each member 42 for securing the members 42 to the shoes 18. The central portion 48 has a reduced body thickness to reduce weight of the member 42.

The arcuate journal portion 34 of each arm 30 has a surface 52 which has a predetermined first radius of curvature and the arcuate socket portion 38 of each arm 32 has a surface 54 having a slightly larger second radius of curvature. The journal portion 34 and the socket portion 38 are sized to provide a normally controlled clearance between arms 30 and 32. The surfaces 52 and 54 are adapted to move into supporting contact when the track shoes 18 are deflected or twisted. As is conventional in endless track assemblies, the first and second ends 20 and 22 of the track shoes 18 are in overlapping relationship. In the subject invention, the first arm 30 of each deflection limiting means 28 is vertically spaced from the first and second ends 20,22 of the shoes 18 and is superimposed over the ends 20,22.

With reference to FIGS. 3 and 4, the problem of the prior art is illustrated, with respect to a track assembly 56. The track assembly includes a plurality of track shoes 58 which are pivotally interconnected by track links 60,62, as is conventional in the construction of endless track assemblies. During operation of track assembly 56, a vertically applied force "F" moves the outer edge portion 64 of the track shoe 58 upwardly to the phantom line position. As shown in FIG. 4, the trailing end portion 66 of shoe 58 contacts the leading end portion 68 of the adjacent shoe 58, and the force in this area of the shoe 58 is shared by both shoes. However, the leading end portion 68 of the displaced shoe 58 is relatively free to move upward, providing no load sharing with the trailing end portion 66 of the adjacent shoe 58. Repeated high vertical loading at the outer ends 64 can lead to accelerated internal track joint wear due to chain twisting, and early structural failures of the track components due to high stresses.

INDUSTRIAL APPLICABILITY

The subject deflection limiting means 28 is particularly useful with endless track assemblies for track-type vehicles, such as bulldozers and excavators. Because track-type vehicles provide relatively low unit ground pressure, they are advantageously used in work applications involving soft ground conditions. In extremely soft underfoot conditions, extra wide track shoes are used on the vehicles to provide an even lower unit ground pressure.

When such wide track shoes are used, an upward force "F" on the shoes (FIGS. 3 and 4) can move the outer edge portion 64 of the shoes 58 upward and produce twisting and deflection of the shoe, resulting in high stress in the track components and increased twist of the track assembly. As shown in FIG. 4, the trailing end portion 66 of the displaced shoe 58 contacts the leading end portion 68 of the adjacent shoe 58 and the load is shared between the shoes. However, there is nothing to restrict the upward movement of the leading end portion 68 of the non-retained, displaced shoe 58 and the above-noted twisting and deflection occurs.

The subject deflection limiting means 28 limits the upward movement of the first and second ends 20,22 (FIGS. 1 and 2) when a vertical force is applied to the shoes 18. Since the first and second arms 30,32 of the deflection limiting means 28 are secured to first and second ends 20,22 of adjacent track shoes 18, and are in overlying proximity to each other, a vertical force moves the arms 30,32 into contact and the force is shared by the adjacent shoes 18. This limits the deflection of individual shoes and reduces the stress in the track components, thereby extending the useful life of the track assembly 10.

Other aspects, objects, and advantages of this invention can be obtained from a study of the drawings, the disclosure, and the appended claims.

I claim:

1. An endless track assembly comprising:
    a plurality of track link assemblies;
    a plurality of pivot joints successively coupling said link assemblies together, each pivot joint having a transversely disposed pivot axis;
    a plurality of track shoes, each having first and second ends and first and second spaced apart outer edge portions laterally spaced from said link assemblies, each shoe being mounted transversely across one of said link assemblies; and
    means for limiting deflection of said outer edge portions of said shoes, said means including a plurality of first arms, each having an arcuate journal portion generated about a first center point which is substantially coaxial with one of said pivot axis, one of said first arms being mounted on each of said track shoes adjacent said second end and at said first and second outer edge portions, and said means also including a plurality of second arms, each having an arcuate socket portion generated about a second center point which is substantially coincident with said first center point, one of said second arms being mounted on each of said track shoes adjacent said first end and at said first and second outer edge portions, said arcuate socket portion of each second arm being in closely overlying proximity to said arcuate journal portion of each first arm.

2. The track assembly, as set forth in claim 1, wherein said first and second arms of each deflection limiting means are joined together.

3. The track assembly, as set forth in claim 1, wherein said arcuate journal portion of each first arm has a surface having a predetermined first radius of curvature and said arcuate socket portion of each second arm has a surface having a predetermined second radius of curvature, said second radius of curvature being slightly larger than said first radius of curvature.

4. The track assembly, as set forth in claim 1, wherein said arcuate journal portion and said arcuate socket portion are sized to provide a normally controlled clearance therebetween and are adapted to move into supporting contact when said track shoes are deflected a predetermined amount.

5. The track assembly, as set forth in claim 1, wherein said first end and said second end of adjacent track shoes are in overlapping relationship and said first arm of each deflection limiting means is vertically spaced from said first and second ends and is superimposed over said first and second ends.

6. A track shoe deflection limiter comprising:
    a body having a mounting surface, a first arm portion, a second arm portion, and a central mounting portion;

said first arm portion having a convex end having a predetermined first radius of curvature and being located at a first end of said body;
said second arm portion having a concave end having a predetermined second radius of curvature and being located at a second opposite end of said body; and
said second radius of curvature of said second arm portion being slightly larger than said first radius of curvature of said first arm portion.

7. The deflection limiter, as set forth in claim 6, wherein said mounting portion includes a central area having a reduced body thickness.

* * * * *

Disclaimer 4,636,013.—*Andrew J. Tonsor*, East Peoria, Ill. TRACK SHOE DEFLECTION LIMITER FOR ENDLESS TRACK ASSEMBLIES. Patent dated Jan. 13, 1987. Disclaimer filed Jan. 17, 1989, by the assignee, *Caterpillar, Inc.*

Herby enters this disclaimer to all claims of said patent.

[*Official Gazette March 7, 1989.*]